(No Model.) 4 Sheets—Sheet 1.

T. O. POTTER.
SUSPENDERS.

No. 322,480. Patented July 21, 1885.

WITNESSES
J. M. Dolan
Fred. B. Dolan

INVENTOR (No Model.)

4 Sheets—Sheet 2.

T. O. POTTER.
SUSPENDERS.

No. 322,480.       Patented July 21, 1885.

WITNESSES.       INVENTOR.

(No Model.) 4 Sheets—Sheet 3.
T. O. POTTER.
SUSPENDERS.
No. 322,480. Patented July 21, 1885.
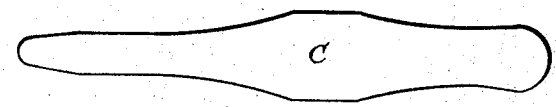
Fig. 7.
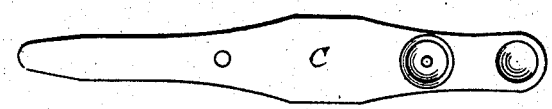
Fig. 8.
Fig. 9.
Fig. 10.
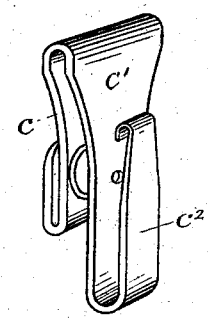
Fig. 11.
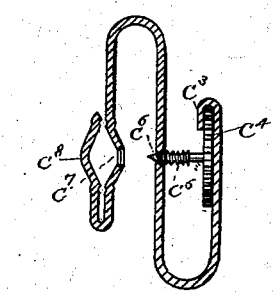
Fig. 12.
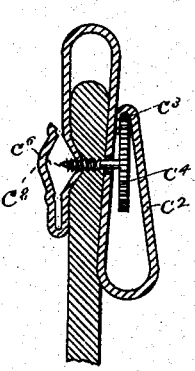
Fig. 13.
WITNESSES.
L. M. Dolan
Fred. B. Dolan.
INVENTOR.
Thos. O. Potter
by his attys
Clarke & Raymond (No Model.)
T. O. POTTER.
SUSPENDERS.
No. 322,480. Patented July 21, 1885.
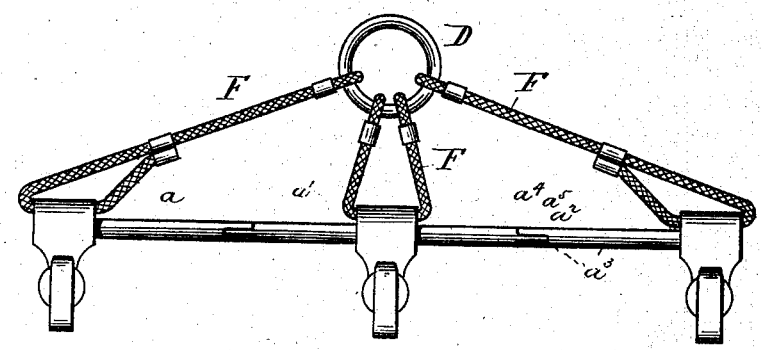
Fig. 14.
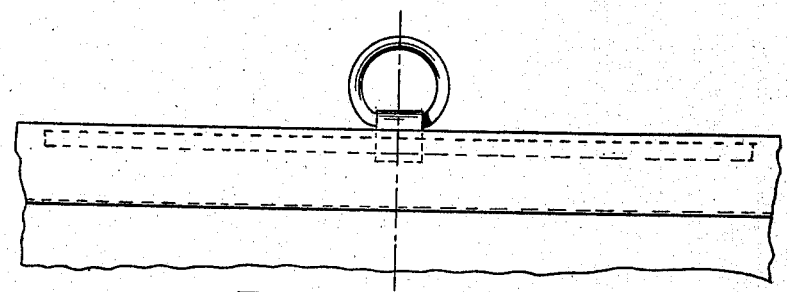
Fig. 16.  Fig. 15.
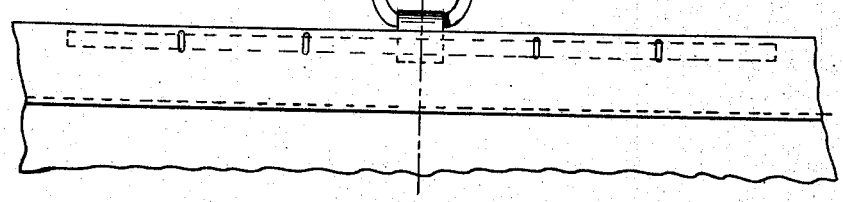
Fig. 18.  Fig. 17.
WITNESSES.  INVENTOR.

UNITED STATES PATENT OFFICE.

THOMAS O. POTTER, OF BOSTON, MASSACHUSETTS.

SUSPENDERS.

SPECIFICATION forming part of Letters Patent No. 322,480, dated July 21, 1885.

Application filed May 1, 1885. (No model.)

*To all whom it may concern:*

Be it known that I, THOMAS O. POTTER, of Boston, in the county of Suffolk and State of Massachusetts, have invented a new and useful Improvement in Suspenders, of which the following is a full, clear, and exact description, reference being had to the accompanying drawings, forming a part of this specification in explaining its nature.
The invention relates especially to suspenders having as a means of attachment to pantaloons or other articles of wearing-apparel two rods or bars attached directly to the waistband, or carrying attaching devices for grasping or holding the waistband of the pantaloons, each of which rods or bars has a ring, eye, lock, or other equivalent device by which it is secured to the end of the suspender-strap.

Figures 1, 2, 3, 4:
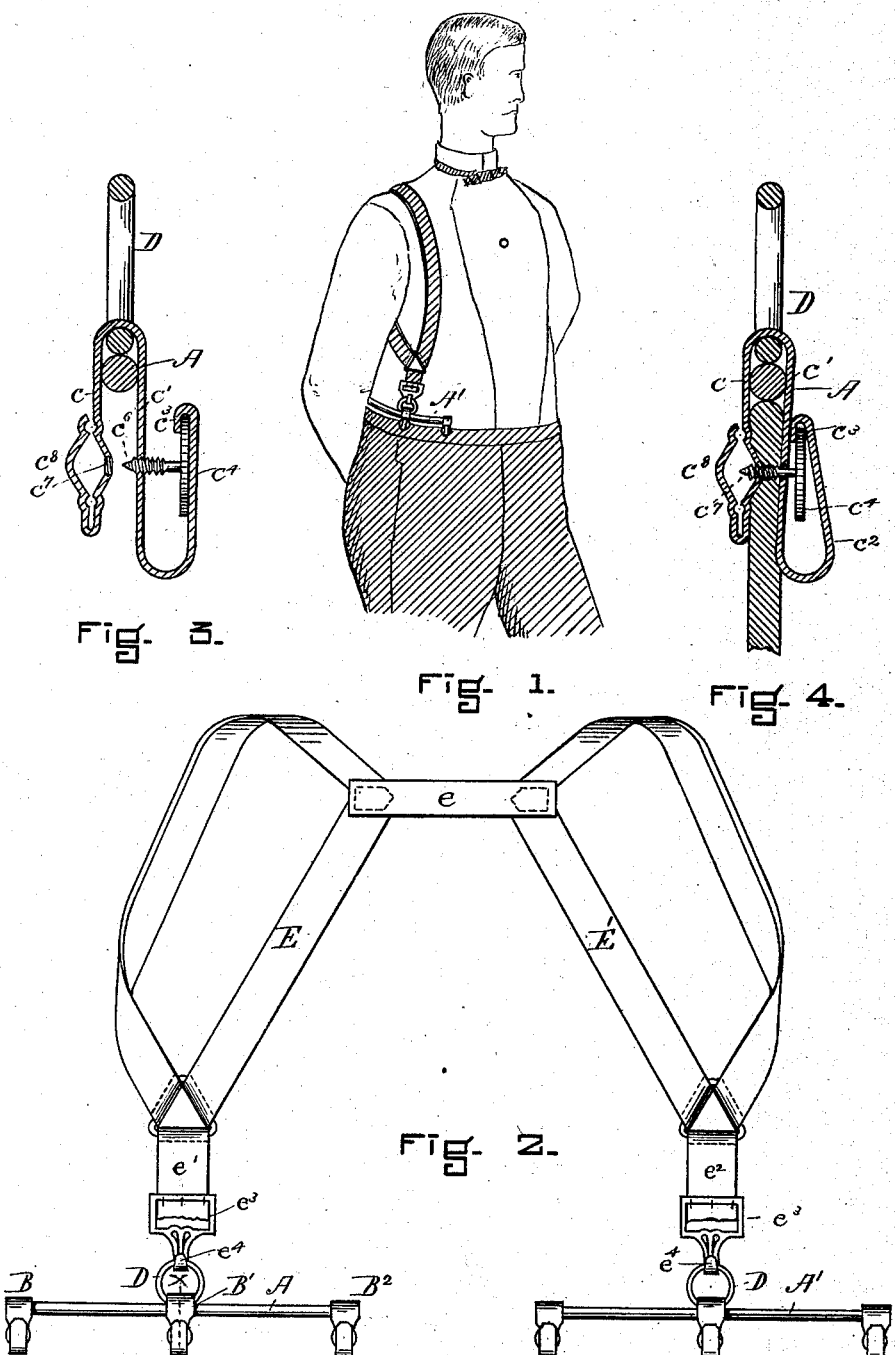
Figure 5:
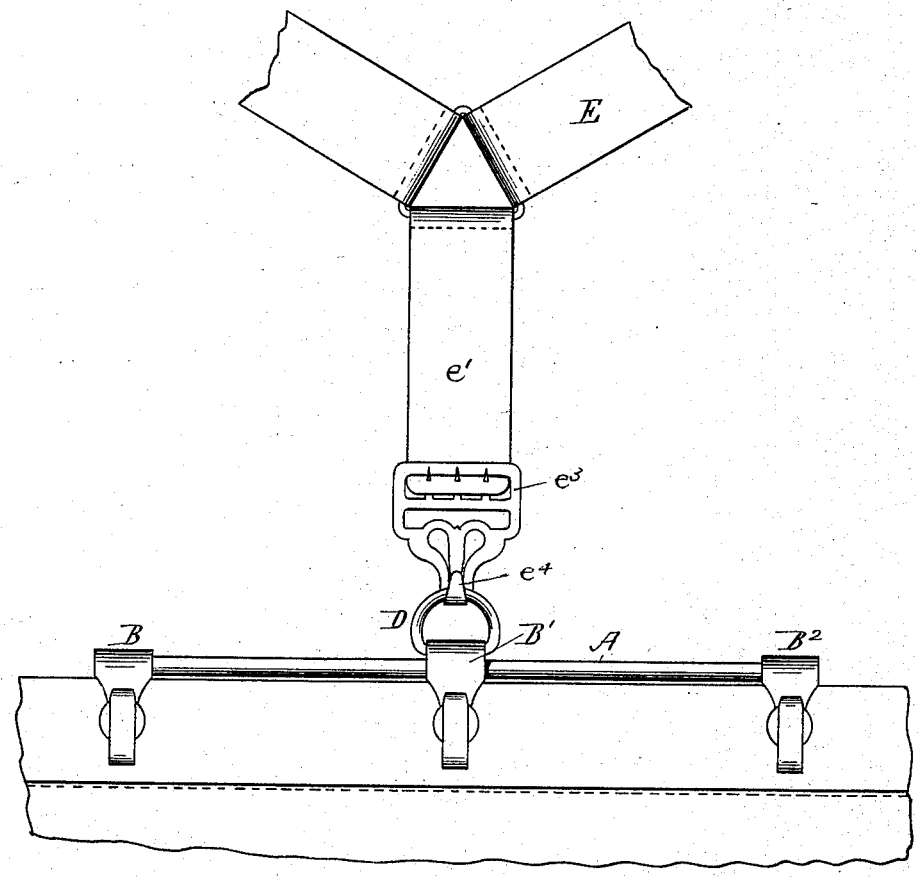
Figure 6:
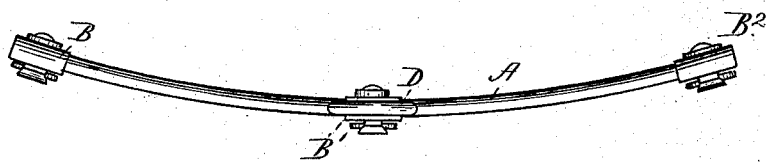

Referring to the drawings, Figure 1 represents the application of my invention, showing the figure of a man, one part of the suspenders or shoulder-braces thereon, and one of the waistband-holding rods or bars, hereinafter specified. Fig. 2 represents in rear elevation the suspenders or braces enlarged from the view shown in Fig. 1. Fig. 3 is a vertical central section upon the line $x\ x$ of Fig. 2, enlarged, showing a device for attaching the waistband to the waistband bar or rod. Fig. 4 is a view on the same section showing the waistband attached. Fig. 5 is a view in elevation, enlarged, of a portion of the waistband, one of the waistband bars or rods, and a portion of the suspenders or braces. Fig. 6 is a plan view, enlarged, of one of the waistband bars or rods. Fig. 7 is a plan view of the form of blank used in making the waistband-attaching device shown in Figs. 1, 2, 3, and 4. Fig. 8 is a side elevation thereof. Fig. 9 represents the said plate after it has been submitted to a forming operation, by which two screw-holes and two cups are formed. Fig. 10 is a vertical central section of a blank thus formed. Fig. 11 shows the blank bent to shape, but without the screw. Fig. 12 is a vertical section thereof, representing the screw-stud in place and the position it occupies before the fastening is secured to the waistband. Fig. 13 shows in vertical central section the position of the parts after the device has been fastened to the waistband. Fig. 14 shows in elevation a flexible or jointed rod or bar, and also the ring or eye by which it is attached to the suspender-end, connected with the bar or rod by cords. Fig. 15 is a view in elevation showing one of the bars or rods as inclosed within the waistband, the ring or eye extending upward therefrom without the waistband. Fig. 16 is a vertical section thereof upon the dotted line of Fig. 15. Fig. 17 shows the bar or rod fastened to the waistband by staples. Fig. 18 is a vertical section thereof upon the dotted line of Fig. 17.

The devices for supporting the pantaloons comprise the horizontally-curved metal rods or bars A A', each of which is attached directly to the waistband either by sewing or by staples, rivets, eyelets, or fastenings of any kind, as shown in Figs. 17 and 18, or by being inclosed within the waistband by the material forming it, as shown in Figs. 15 and 16; or the rods or bars may carry at pleasure appliances for taking hold of or grasping the waistband of the pantaloons at two or more points in a manner to permit of the removal of the waistband therefrom. In the drawings each of these rods or bars is provided with three attaching devices, B B' B², and when properly secured to the waistband they occupy the place of the buttons ordinarily used for receiving the suspender-ends. The attaching devices which I have represented, and which form the subject-matter of a separate application, each comprises a metal plate, C, which is bent over its bar or rod to provide the downward and substantially parallel extensions of parts $c\ c'$ for supporting a cross stud or screw, which is adapted to pass through the waistband. The outer portion or part, $c^2$, of this plate is bent upward to the form represented in Fig. 12, and then downwardly to form the flange $c^3$, and within the space formed by this flange extends the head $c^4$ of the screw $c^5$, which passes through the screw-hole $c^6$ formed in the front part, $c'$, of the plate, and when screwed in the inner end of the screw enters screw-hole $c^7$ upon the rear or back portion, $c$, of the plate, and its end is protected or covered by the cap $c^8$, which, preferably, is formed upon the outer end of the plate $c$, which is turned or folded back, as represented, so as to bring it in line with the hole $c^6$. The arm $c^2$ holds the head of the screw and prevents it from being readily moved too far outward, so that it cannot easily be lost. It must of course be a spring or yielding arm, in order that it may follow the screw-head as it is moved in or out. The plate $c\ c'$ is fastened to the bar or rod by a rivet or in any other suitable way. Each bar or rod also bears or supports the ring, eye, or equivalent device D for receiving the fastening device upon the end of the suspender-strap, and this device, preferably, is secured to the bar or rod by the central (of the fastening device) holding plates, which is made somewhat longer than the end plates to provide a space or recess above the upper edge of the bar or rod to receive the ring or other equivalent device, and to support it so that it may be moved backward and forward crosswise the length of the rod or support.

To secure these supporting devices in place to the waistband of the pantaloons or other article of wearing-apparel, the screws are screwed outward and the waistband inserted between the front and rear portions of the holding-plates, and the bars or rods are adjusted thereon, so that the fastening devices shall occupy substantially the position which the ordinary suspender-buttons have, and the screws are then turned inward, the points penetrate and pass through the waistband and enter the holes in the rear portion of the plate, and the device is thus firmly secured to the waistband, and being once fastened, they become a more or less permanent fixture of the pantaloons. They are adapted to be used with any form of suspenders, and I prefer a form having one suspender-end on each side, as shown in Fig. 2, and which comprises the shoulder-straps E E', united by the cross-piece $e$, and supporting the side end straps, $e'\ e^2$, each of which carries or holds the buckles $e^3$, having the spring-latch hook $e^4$, which is adapted to engage with or hook into the ring D of one of the bars or rods; but I would not be understood as confining myself to this special form of suspenders or to the particular form of buckle and hook herein shown, as I may use any equivalent therefor.

The waistband bars or rods may be made to yield horizontally somewhat, and they may be made of more than one piece, as represented in Fig. 14, where one bar or rod, to illustrate the construction, is shown made in three parts, $a\ a'\ a^2$, the end parts $a\ a^2$ being hinged to the ends of the part $a'$ to swing laterally or horizontally. The construction which I have shown comprises a recess, $a^3$, formed in the ends of the part $a'$, which receives the tongues $a^4$, formed on the inner end of each end piece, $a\ a^2$, the parts being united by the pivots $a^5$. The shape of the tongues may be such as to prevent the end pieces from being swung outward more than a limited distance.

The bar or rod may be made in five parts instead of three, the parts being hinged together, as above described. As above described, this construction gives a little greater adjustability to the bars or rods. I here desire to state that the bars or rods may be made continuous, or substantially continuous, instead of in two parts, and so as to extend entirely around the body when in use, if desired, and when so constructed, it may have a hinge at the back and a clasp at the front, to allow it to be opened, and also to permit its ends being secured or locked together.

In Fig. 14 I show a modified form of construction, in which the eyes or rings D, instead of being secured directly to the said rods or bars, are secured thereto by the cords, straps, or pieces F, extending therefrom, the two end cords or straps of the suspenders, braces, or shoulder-straps extending diagonally upward, and the central cord or piece substantially straight.

It will be observed that in use the straps of the suspenders, braces, or shoulder-straps are connected with the pantaloons and pantaloons supporting and holding devices at two points only, and that those points are upon each side of the pantaloons beneath the arms, where the movements of the body communicate the least extent of amount of movement to the strap ends.

It will also be observed that the connection of the braces, suspenders, or straps with the pantaloons is by means of a flexible or universal joint, which permits the free movement of the straps in relation to the rods or bars without binding or drawing.

It will also be noticed that the bars or rods hold the pantaloons, breeches, or other similar article of wearing-apparel supported by as large a section of the waistband as may be desired in such a manner as to hold it off from the body and to prevent sagging of any part thereof, so that a better setting of the pantaloons or breeches is obtained and maintained and the strain upon the waistband equalized and distributed.

When the rods are attached directly to the waistband, or inclosed by the waistband, they may be made of whalebone, wood, gutta-percha, or any material sufficiently strong when so attached to sustain the weight of the pantaloons or other article supported thereby.

Having thus fully described my invention, I claim and desire to secure by Letters Patent of the United States—

1. The suspenders, braces, or other similar article having the waistband bars or rods secured to the waistband, as set forth, and to the ends of the suspenders in a manner to be removable therefrom, all substantially as and for the purposes described.

2. As a means for supporting pantaloons or other articles of wearing-apparel, the bars or rods connected with, attached to, or held within the waistband of the pantaloons or other articles, and having means of attachment to suspending-straps of suspenders, braces, or shoulder-straps, all substantially as and for the purposes described.

3. The combination, in suspenders, braces, or shoulder-straps of the rods or bars, the rings or eyes D, and the suspending straps or ends $e\ e'$, of the suspenders, braces, or shoulder-straps, all substantially as and for the purposes described.

4. The waistband bar or rod of suspenders or braces constructed to have a horizontal adjustment or movement to vary the degree of its curve, all substantially as and for the purposes described.

5. The suspenders or braces comprising waistband rods or bars sustaining or carrying waistband-attaching devices, and shoulder-straps for suspending the same, all substantially as and for the purposes described.

6. The combination, in suspenders or braces, of the shoulder or supporting straps having the ends $e\ e'$ arranged in relation to the straps, as shown, the waistband-supporting bars or rods A A', having the loops or rings D, arranged in relation thereto, as described, and the devices $e^4$ for attaching the loops, rings, or eyes to the suspender-ends, all substantially as and for the purposes described.

THOMAS O. POTTER.

Witnesses:
F. F. RAYMOND, 2d,
FRED. B. DOLAN.